April 18, 1933.  E. KNAPP ET AL  1,904,832
TRACTOR POWER COUPLING MECHANISM
Original Filed Dec. 2, 1927  4 Sheets-Sheet 1
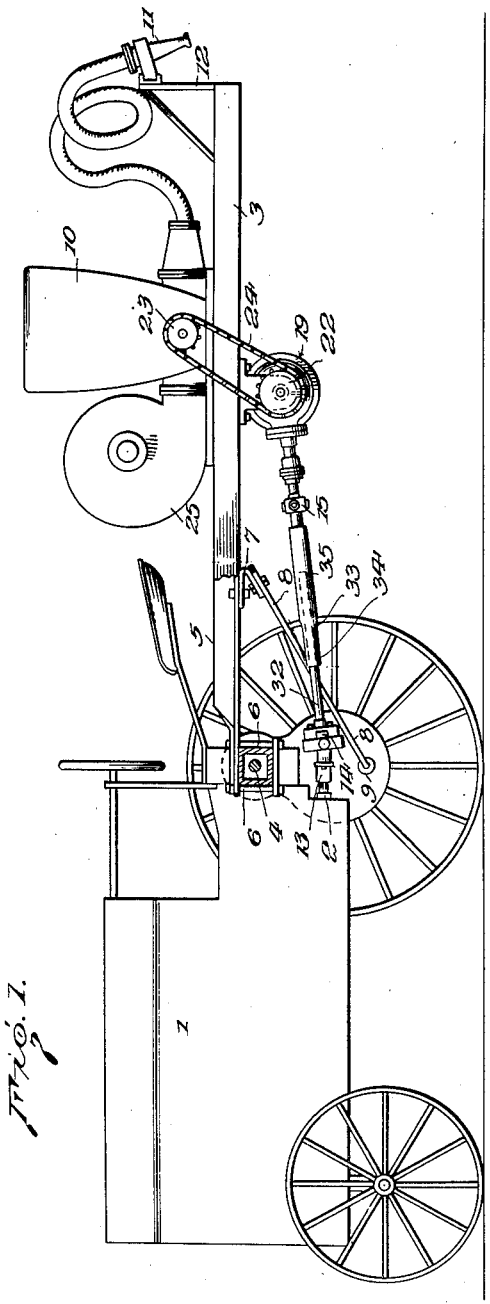
Inventors
Edgar Knapp,
Carl T. Allgrunn
By Alonzo S. McDaniel
Attorney

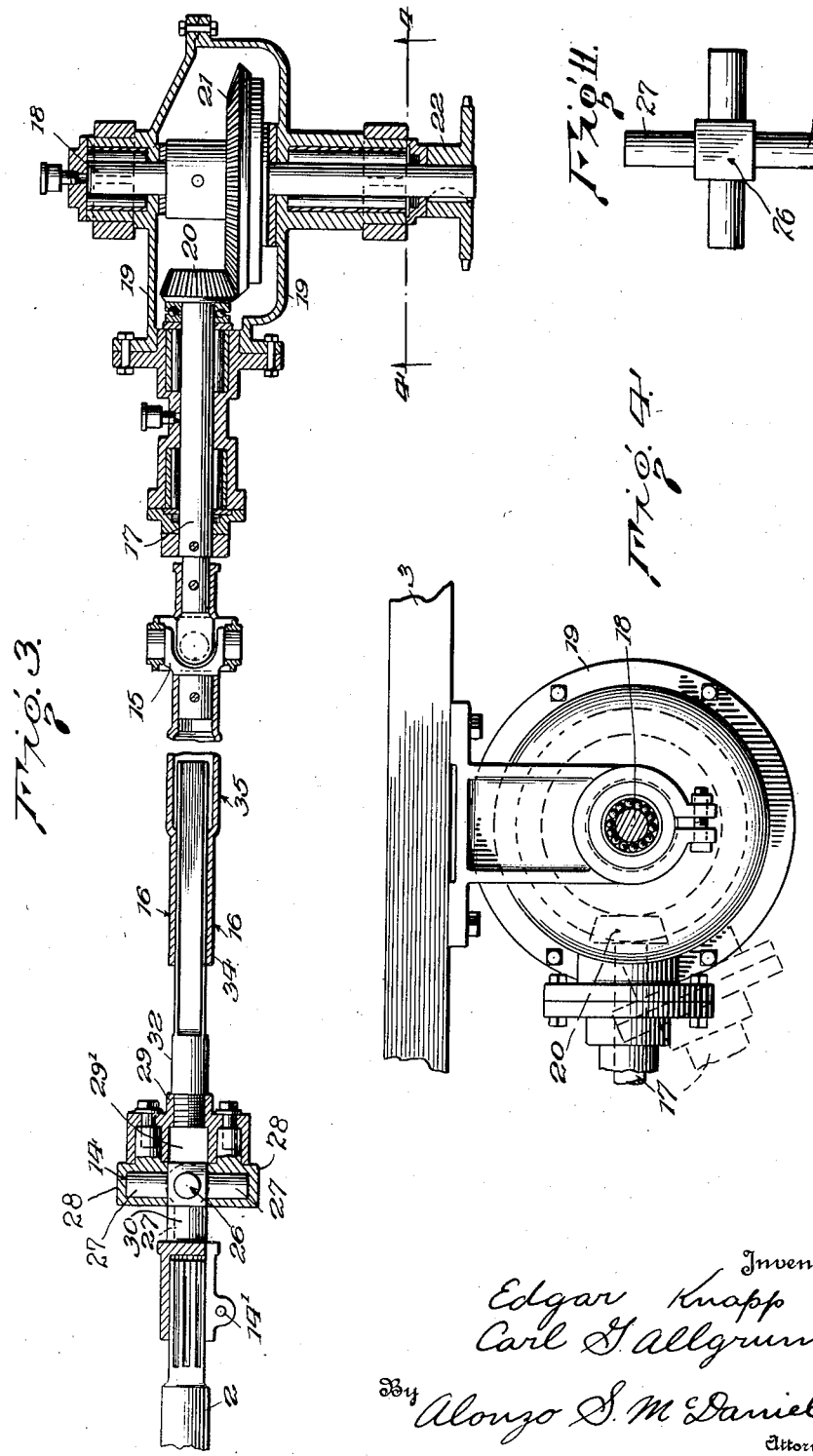

April 18, 1933.  E. KNAPP ET AL  1,904,832
TRACTOR POWER COUPLING MECHANISM
Original Filed Dec. 2, 1927  4 Sheets-Sheet 3
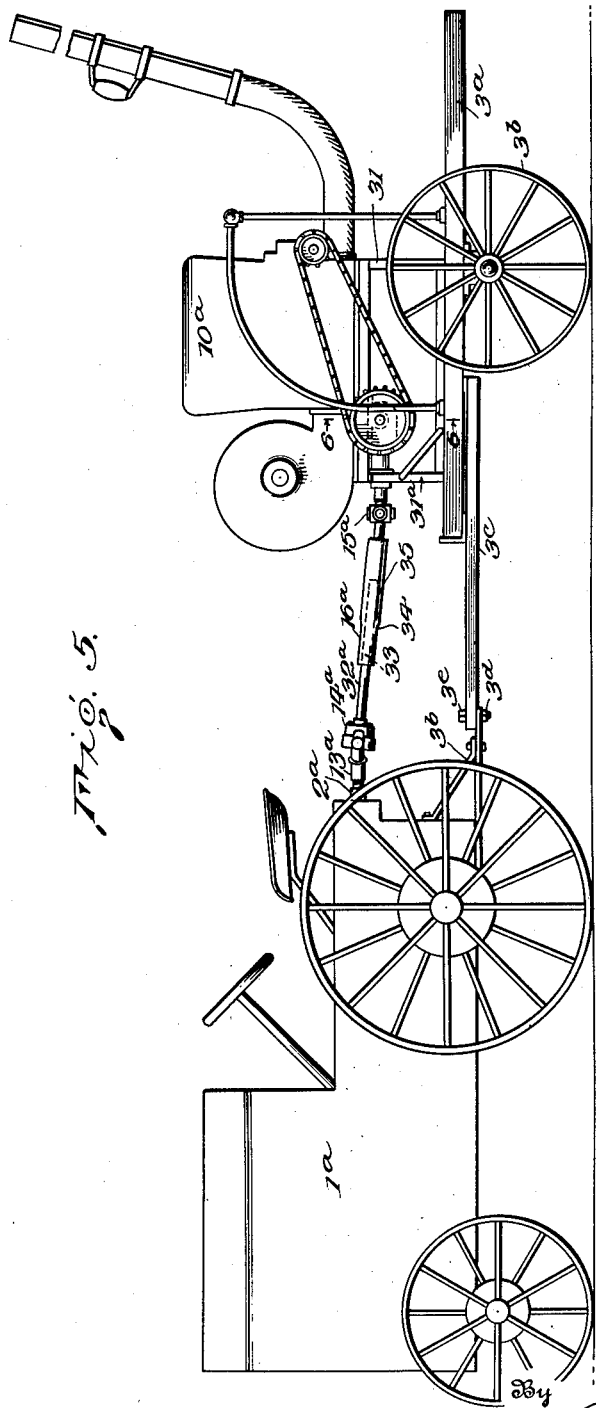
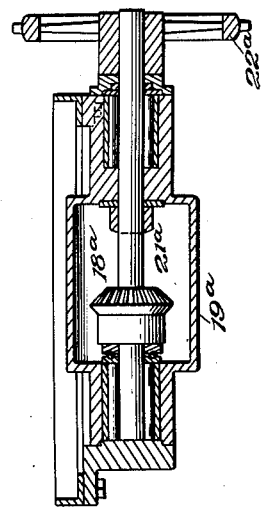
Inventor
Edgar Knapp
Carl G. Allgrunn
By Alonzo S. McDaniel
Attorney April 18, 1933.  E. KNAPP ET AL  1,904,832
TRACTOR POWER COUPLING MECHANISM
Original Filed Dec. 2, 1927   4 Sheets-Sheet 4
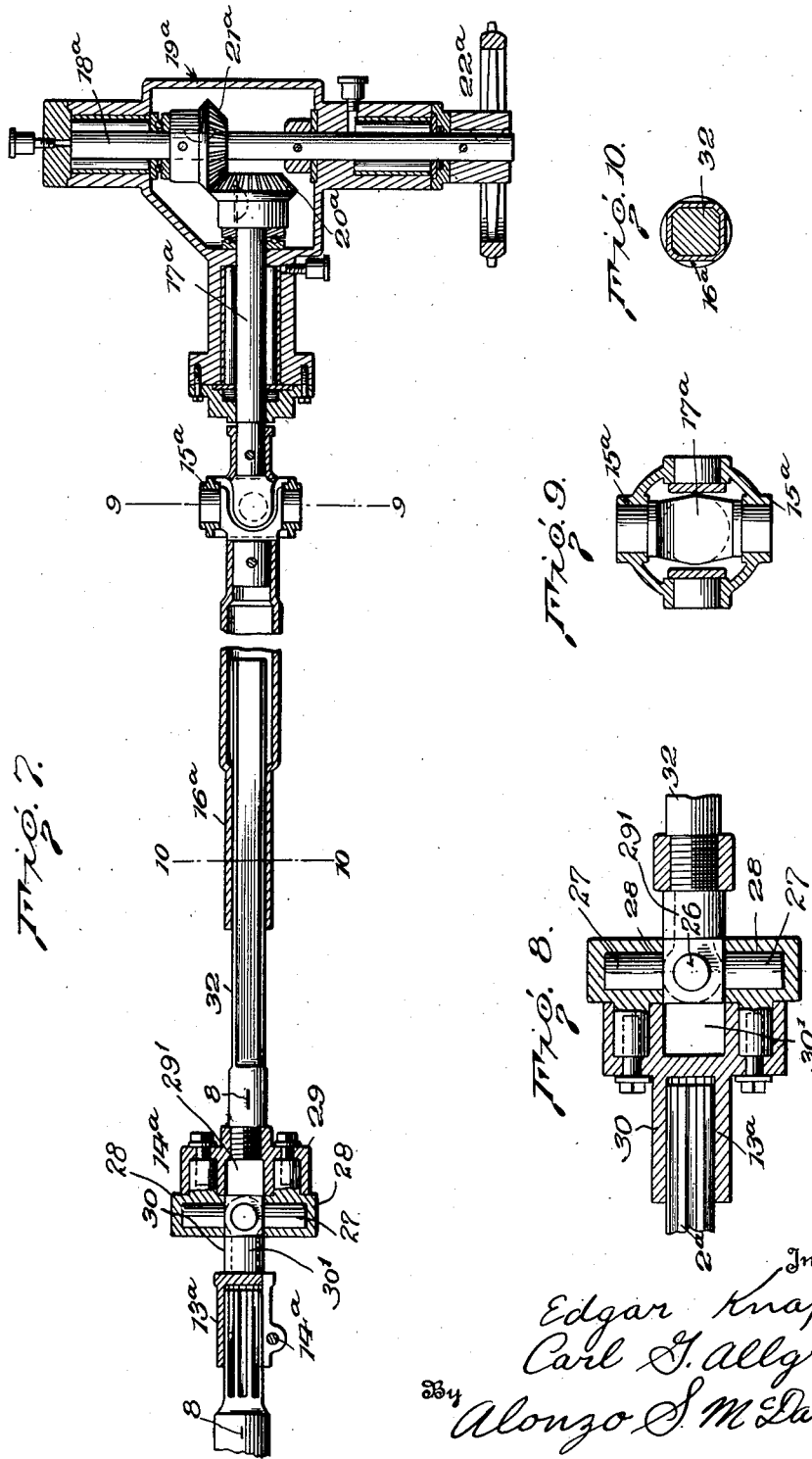

Patented Apr. 18, 1933

1,904,832

UNITED STATES PATENT OFFICE

EDGAR KNAPP AND CARL G. ALLGRUNN, OF MIDDLEPORT, NEW YORK; GEORGE F. THOMPSON EXECUTOR OF SAID EDGAR KNAPP, DECEASED

TRACTOR POWER COUPLING MECHANISM

Original application filed December 2, 1927, Serial No. 237,203. Divided and this application filed September 27, 1930. Serial No. 484,869.

This invention relates to an apparatus wherein a source of power for propelling a vehicle may be by suitable connection utilized also for operating a device transported with the vehicle, and the invention relates particularly to a coupling mechanism for causing some of the power generated by the motor which propels the device over the ground, to operate a device for distributing insecticides and fungicides over vegetation.

It has long been recognized that insects and fungus growths cause much destruction of vegetation, and many devices have been constructed for the purpose of applying liquid or powdered insecticides to growing plants and the like. Generally, the devices heretofore employed have been of a hand-operated type, but some power operated machines have been provided which are driven from a ground wheel of the vehicle on which the machine is transported. Other machines have been constructed which include a separate motor carried on the vehicle for the purpose of operating the distributing mechanism, and while some of these machines are quite efficient, they are nevertheless somewhat expensive due to the fact that an independent source of power for the distributing mechanism is required. While, in some instances, attempts have been made to utilize a tractor for supporting or propelling distributing mechanism of this character, and the tractor motor employed for operating the distributing mechanism, difficulty has been experienced in the turning of the tractors, particularly when the distributing mechanism is mounted on a trailer, which turning often resulted in great damage to the vegetation.

The present invention has for an object the provision of an apparatus capable of being used for depositing insecticides and the like upon vegetation without injury thereto, and the invention further contemplates such an apparatus adapted to be driven along the rows of vegetation and capable of being turned within a short space.

Another object of the invention is the provision of an apparatus for distributing insecticides, in which the distributing mechanism may be operated by the same source of power as that employed for propelling the device over the ground, and yet one in which the distributing device may be operated simultaneously with the transmission mechanism for propelling the device over the ground, or independently thereof.

A further object of this invention is the provision of an attachment for tractors, for distributing insecticides, which attachment may be quickly connected to or disconnected from the tractor without completely disassembling the attachment.

Other objects and advantages will be apparent from the following detailed description when considered in connection with the accompanying drawings, wherein Figure 1 is a side elevation of one form of apparatus constructed in accordance with this invention;

Fig. 2 is a sectional view taken through Fig. 1, showing the rear axle of the tractor and the supporting frame for the distributing mechanism;

Fig. 3 is a sectional view of the power transmission mechanism shown in Fig. 1;

Fig. 4 is a sectional view taken on line 4—4 of Fig. 3;

Fig. 5 is a side elevation of a modified form of apparatus which is adapted to be operated in a manner similar to the structure shown in Fig. 1, but in which the distributing mechanism is supported upon a trailer;

Fig. 6 is a sectional view taken on line 6—6 of Fig. 5 through a portion of the power transmission mechanism;

Fig. 7 is a longitudinal sectional view similar to Fig. 3, but showing a slightly modified form of transmission mechanism of a type used in connection with the structure shown in Fig. 5;

Fig. 8 shows a sectional view through a wide angle universal joint as used at the forward end of the transmission mechanism as shown in Fig. 1 and Fig. 5, the view being taken perpendicular to the illustration of Fig. 7;

Fig. 9 is a vertical sectional view taken on line 9—9 of Fig. 7;

Fig. 10 is a vertical sectional view taken on line 10—10 of Fig. 7, this view illustrating the slip joint connection of the power transmission shaft;

Fig. 11 is an elevation of the spider of the universal joint shown in Fig. 8.

Now referring to the drawings in detail, and more particularly to Figs. 1 to 4 inclusive, the reference numeral 1 indicates a tractor of a standard design such as is used in agricultural work. The gauge of the wheels in these tractors is such with relation to standard mechanical planters that the wheels can be run in the spaces between adjacent rows of vegetation resulting from the use of such planters. Furthermore, this type of tractor is so constructed that the wheels maintain the mechanism of the tractor spaced sufficiently from the ground so that the vegetation will not be damaged by the passage of the tractor over a field of vegetation with the wheels running in the spaces between the rows, having a power take-off shaft 2 adjacent the center of its rear axle, to which shaft a distributing device, to be hereinafter referred to, is adapted to be connected, the distributing mechanism deriving its power from said power take-off shaft.

A platform of framework 3 is mounted at one end upon the rear axle housing 4, and in the preferred embodiment of our invention two angle irons 5, forming part of the framework 3, extend forwardly and are secured to the axle housing 4 by means of yokes 6. Attached to the framework 3 are angle brackets 7 which are adapted to be bolted to a brace 8, which is of a U-shaped formation having the forward ends of its arms pivotally connected to the rear axle housing at points adjacent the driving wheels of the tractor, as indicated at 9. The brackets 7 are bolted to the brace 8 on the arms adjacent the ends opposite to the points of pivot indicated at 9, when the brace is in the position shown in Fig. 1. It is apparent from the construction described, that the connection between the angle brackets 7 and the brace 8 cause the framework or platform to be mounted as a cantilever, when secured to the axle housing 4 through the medium of the yokes 6. A driven device 10 which is, in the present instance, a blower and feed mechanism for powdered insecticides, is mounted upon the framework 3 and, as previously stated, is adapted to be driven through connections which are operatively associated with the power take-off shaft 2.

The insecticide distributing device 10 has associated therewith a nozzle 11 adjustably secured on a transversely extending support 12, so that the nozzle can be so mounted that the insecticide will be distributed in a direction toward the vegetation intended to be treated. If preferred a number of nozzles similar to 11 may be mounted upon the support 12, these nozzles being connected to one another by means of a common manifold which is, in turn, connected to the discharge end of the power operated mechanism.

Arranged beneath the framework 3 is a mechanism for transmitting power from the tractor to the distributing mechanism, and as illustrated in Fig. 1 and shown in detail in Figs. 3 and 4, this mechanism is formed of a connection 13 which may be of an internally ribbed tubular type that fits over and is secured to the power take-off shaft 2, so that the ribs engage in grooves on the power take-off shaft and cause the two elements to be keyed together for rotation. This connection 13 is made secure upon the power take-off shaft 2 by means of a bolt 14' that effects a clamping action when tightened due to the contraction of a slot arranged in the wall of connection 13.

Universal joints 14 and 15 are positioned at each end of a transmission shaft 16, and cooperating shafts 17 and 18 are mounted in a housing 19, these shafts 17 and 18 carrying respectively the gears 20 and 21 and arranged exteriorly of the housing 19 and mounted on the protruding end of the shaft 18 is a sprocket 22. The distributing mechanism 10 has arranged at one side of the hopper thereof a gear for causing the operation of feeding mechanism, the gear being indicated by the numeral 23, and this gear and the gear 22 have trained thereover a sprocket chain 24. A fan arranged within a casing 25 may be operatively connected with gear 22 or gear 23 for causing a blast of air to discharge the powdered material, or the fan may be independently operated. It will be seen that, upon the operation of the power take-off shaft 2, the insecticide distributing mechanism will me operated through the transmission mechanism generally described.

The universal joint referred to above, is of a construction adapted to turn through a wide angle, that is an angle greater than 90°. This universal joint 14 is formed of a spider 26 having a cubical central portion with four stub shafts 27 radiating at right angles to each other from four of its sides. Cup members 28 each provided with shanks are fitted over the stub shafts, and two of the cup members 28 are secured but having the shanks thereof extending into recesses of a yoke member 29 which is, in turn, carried by the shaft 16. The other two cup members 28 are singularly secured to a yoke member 30 mounted on the coupling 13, as is clearly shown in Fig. 8. It will be readily understood that since the open spaces 29' and 30' are provided in the yokes 29 and 30, which openings are large enough to receive the cup members 28, the shaft 16 may be swung in any direction until it contacts with either yoke member 29 or 30, which angle will be considerably in excess of 90°. It is of course, to be understood that this universal joint is not intended to transmit power at wide angles, but that the shaft, when not rotating, may be swung to such wide angles, which will facilitate the application of the attachment to the tractor, particularly since it is not intended to disassemble the attachment when connecting or disconnecting the same from the tractor.

In the construction shown in Fig. 1, the universal joint, as suggested, is of particular importance when the platform 3 is being removed from the tractor. The removal of the framework 3 from the tractor would ordinarily be accomplished by removing the bolts from the yokes 6 and permitting the framework 3, which is still secured to the brace 8 by means of the bracket 7, to swing about the pivots 9 until the platform rests at one end upon the ground. Due to the construction of the universal joint 14, it is not necessary that the tractor be drawn upon level ground for disconnecting the distributing mechanism and platform, as the shaft 16 may be swung through a vertical angle of a width greater than would be possible by a universal joint of normal construction. If the bolts are first removed from the brackets 7 and the framework is permitted to drop before the clamp 13 is removed, no injury is done to the device, and therefore this attachment permits its connection or disconnection from the tractor by means of unskilled labor.

When attaching the framework 3 to the tractor, it may be supported at suitable height, and the tractor backed into position, whereupon the bolts of yokes 6 are secured in place. The connection 13 may be coupled to the power take-off shaft 2 initially, or it may be coupled after the framework 3 is in place. The shaft 16 may be shortened by virtue of its telescopic portion and the connection 13 slipped over the power take-off shaft 2 and secured in position as previously described. However, if desired, the framework 3 may be placed upon the ground so as to rock on the housing 19, whereby the angle irons 5 are moved into positions where they can be bolted to the axle housing 4, when the same is entirely elevated. The framework 3 may be conveniently elevated by securing the brackets 7 to the brace 8, and thereafter swinging the framework about the pivots 9 of the brace 8, after which the angle irons 5 are bolted in place by means of yokes 6. Connection 13 may be clamped to the power take-off shaft 2 either before or after bolting the platform 6 in place, as its telescopic construction permits lengthening or shortening thereof. It will be seen from the foregoing description that the platform may be readily attached or removed by a little labor in a short period.

In the construction shown in Fig. 5, it will be noted that the distributing mechanism is supported upon a platform 3a, which is, in turn, mounted upon the ground wheels 3b so that the framework and the wheels together with the drawbar 3c may be utilized as a trailer.

The drawbar 3c is adapted to be pivotally connected to the tractor at 3d by a pin bolt 3e which cooperates with a brace 3f carried on the tractor. In this modified construction, the power transmitting mechanism is arranged above the drawbar 3c as well as above the framework 3a. The power transmitting mechanism is adapted to be connected to the power take-off shaft 2a by means of the connection 13a, which connection is of the same formation as the connection 13 employed with the construction shown in Figure 1.

Mounted on the framework 3a is a powder distributing mechanism, of the same general type described in connection with Figure 1, and this mechanism is connected with the power take-off shaft 2a by means of the power transmission shaft 16a, and cooperating shafts and gears; the shaft 16a having arranged at its forward end a wide angle universal joint 14a, and at its rearward end a universal joint 15a.

While the shafts of the power transmitting mechanism, the universal joints, and the gears are similar to those employed in connection with the power transmitting mechanism shown in Fig. 1, the housing 19a and the gear 21a, together with the shafts 17a and 18a, are slightly modified as will be apparent from the drawing. The distributing mechanism 10a may be mounted above the framework 3a upon a support 31, which permits the shaft 16a of the power transmitting mechanism to be nearly horizontal, and therefore eliminates to some extent the wear of the universal joint when the device is operating.

The wide angle universal joint 14a is of decided importance in the operation of the device illustrated in Fig. 5, as will be apparent from the description of the operation of this modified form of the device.

In operating the device illustrated in Fig. 5, the tractor draws the trailer, with the distributing mechanism 10a mounted thereon as described, along the rows of vegetation, and the tractor is so operated that the power take-off shaft 2a causes the transmission of power to the powder distributing mechanism 10a, which is, in turn, operated for discharging a cloud of dust-laden air through the nozzle 11a upon the vegetation.

As the universal joint 14a can transmit power through a relatively wide angle, the passage of the tractor and trailer over extremely uneven ground does not affect the efficient operation of the device. When the end of a row of vegetation being treated is reached, it is possible to make a turn which involves an angular displacement of the trailer with respect to the tractor greater than 90°, merely by discontinuing the rotation of the power take-off shaft 2a, as the universal joint 14a would not permit rotation thereof while an angular displacement of such degree exists. However, in normal operation a machine for treating vegetation would be stopped while turning, to avoid wasting of material during the turning operation, as the turning operation required a reduction in the speed of advancement over the ground, and, furthermore, the turning operation usually takes place at a point beyond the ends of the rows of vegetation.

The shaft 16 of Fig. 1 and the shaft 16a of Fig. 5, as stated, are of similar construction, and it will suffice therefore to describe the shaft shown in Fig. 1. The shaft 16 is formed of a bar section 32 which is securely attached to the yoke 29 of universal joint 14. The bar section 32 is provided with a squared portion 33, which is adapted to cooperate with a squared portion 34 of a tubular section 35 for keying the bar section and the tubular section together for rotation. The tubular section 35 has the squared portion 34 arranged at the extreme end thereof, and the portion of the tubular section 35 arranged rearwardly of the section 34 is of such size that it does not contact with the bar section 32 in any way. The end of the tubular section 35 is secured to the universal joint 15 for causing the rotation thereof during the operation of the mechanism. It will, therefore, be apparent that the telescoping connection of the shaft 16 permits the extension and contraction thereof as the framework 3 is vibrated, so that it assumes a position at an angle to the tractor, and that due to the fact that that portion of the tubular section 35 which cooperates with the bar section 32 for keying the two sections together, is relatively short, dust or grit, which may be present in the art in which the device is operated, will cause friction to exist against the extension and contraction of the shaft 16 to a minor or ineffective degree, the end of the bar section 32 extending into the tubular section 35 beyond the section 34, in no way aiding the frictional contact.

Although we have described above the preferred form of our invention, many variations in the construction and operation may be made without departing from the spirit of the invention. This application is a division of our application Serial Number 237,203, filed Dec. 2, 1927.

What we claim is:

An apparatus for treating growing plants, comprising an automotive tractor having a power take-off shaft adjacent the center of its rear axle, means enclosing the rear axle, a brace having portions secured to the enclosing means on each side of the power take-off shaft and at points below the plane of the power take-off, said brace being tilted upwardly from the horizontal, a platform having a portion of its frame extended forwardly over the brace and being provided with means at the extremity of said extended portion for securing it to said tractor, means on the bottom of said frame secured to the upwardly tilted brace, whereby the latter is constituted a cantilever support for said platform, a driven device mounted on the platform, and self adjusting means for transmitting power from the tractor motor to the driven device.

In testimony whereof we affix our signatures.

EDGAR KNAPP.
CARL G. ALLGRUNN.